(12) United States Patent
Gordon et al.

(10) Patent No.: US 6,967,463 B1
(45) Date of Patent: Nov. 22, 2005

(54) BATTERY CHARGER

(76) Inventors: John B. Gordon, P.O. Box 733, Granger, IN (US) 46530; Roger M. Burger, P.O. Box 733, Granger, IN (US) 46530; David M. Gordon, P.O. Box 733, Granger, IN (US) 46530; Stephen E. Gerencser, P.O. Box 733, Granger, IN (US) 46530; Daryl D. Hochstetler, P.O. Box 733, Granger, IN (US) 46530

( * ) Notice: Subject to any disclaimer, the term of this patent is extended or adjusted under 35 U.S.C. 154(b) by 114 days.

(21) Appl. No.: 10/721,919

(22) Filed: Nov. 24, 2003

(51) Int. Cl.[7] ...................... H01M 10/44; H01M 10/46
(52) U.S. Cl. ...................................... 320/103
(58) Field of Search ............... 320/103, 104, 320/116, 128, 132, 137, 138

(56) References Cited

U.S. PATENT DOCUMENTS

| | | | |
|---|---|---|---|
| 4,433,277 A * | 2/1984 | Carollo et al. | 320/149 |
| 6,271,642 B1 * | 8/2001 | Dougherty et al. | 320/104 |
| 6,452,361 B2 * | 9/2002 | Dougherty et al. | 320/104 |
| 6,737,832 B2 * | 5/2004 | Uchida | 320/138 |

* cited by examiner

Primary Examiner—Edward H. Tso

(57) ABSTRACT

A battery charger for a charging marine batteries in a boat with an automobile while the boat is being towed behind the automobile. The battery charger connects the automobile's charging system to the boat's batteries. The charger causes the boat's batteries to be cyclically charged and monitored to prevent the automobile electrical system from overcharging the boat's batteries.

4 Claims, 4 Drawing Sheets

BATTERY CHARGER

BACKGROUND OF THE INVENTION

1. Field of the Invention

The invention disclosed herein relates to a battery charger apparatus, and more specifically, a battery charger for charging a battery having one voltage rating with a charging system for recharging a battery having a second voltage rating, such as, for example, recharging marine batteries with an automotive electrical system.

2. Discussion of the Prior Art

Recreational fishing boats often have trolling motors that are usually powered by a pair or more of marine batteries coupled to the motor either in series or in parallel depending on the requirements of the motor. These batteries are not normally connected to an alternator driven by the boat's main engine, and so nesed to be recharged after use from an outside power source.

The marine batteries cannot be re-charged simply by connecting them directly to an automotive electrical system such as when a car is used to recharge the battery of another car. This is due to the actual voltage difference between the automotive electrical system, which operates at approximately 13.8 volts, and the marine electrical system, which operates at approximately 12.8 volts. Because the automotive system operates at a higher voltages than the marine system, the current supplying automotive system will overcharge the marine batteries if not disconnected when the marine batteries are fully re-charged. This can cause catastrophic failure in the marine batteries. Therefore, the boat's trolling batteries are usually re-charged by connecting an ordinary stationary battery charger to them while the boat is not being used.

Using a stationary battery charger can be problematic, however, when it is desired to move the boat from one lake directly to another and continue trolling because the batteries cannot be recharged during transit. It is inconvenient because the user must either stop to recharge the batteries or continue using the trolling motor with depleted batteries. It would be desirable, therefore, to have a way to recharge the trolling motor's batteries while the boat is being towed on a trailer.

SUMMARY OF THE INVENTION

A battery charger is provided for charging a first battery having a first voltage rating with a charging system for recharging a second battery having a second voltage rating. The battery charger includes a relay switch interposed between the first battery and the charging system. The battery charger is connected to a voltage monitor and a clock. The clock causes the relay switch to alternatingly open and close at predefined time periods. The voltage monitor monitors the voltage of the first battery and causes the circuit between the first and second batteries to remain open when the first battery reaches a predefined voltage.

BRIEF DESCRIPTION OF THE DRAWINGS

These and other aspects of the invention will be apparent from the following description, with reference to the accompanying drawings, in which.

DETAILED DESCRIPTION

Figure 1:
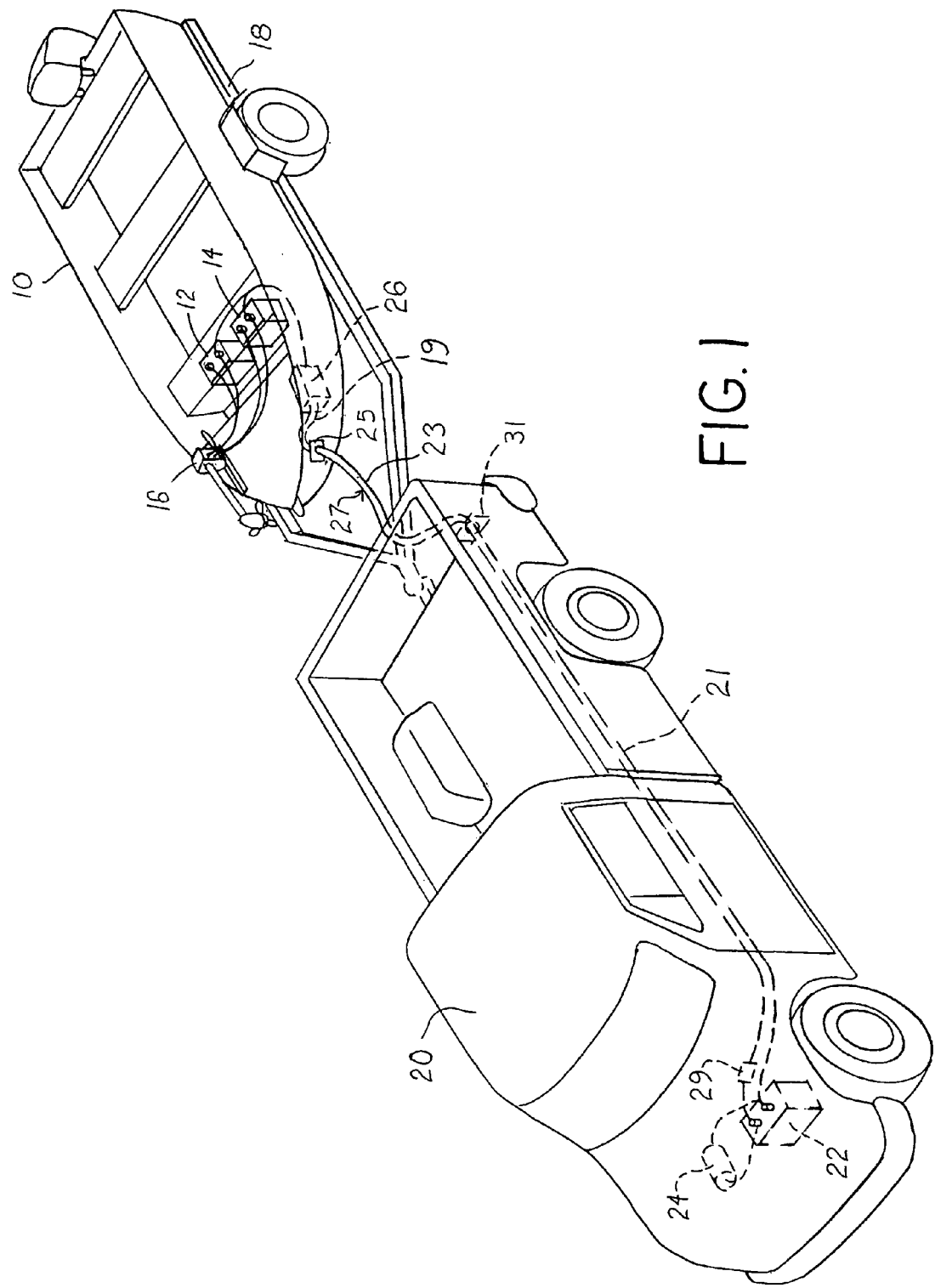
FIG. 1 is a perspective view of a towing vehicle towing a trailer carrying a boat having the battery charger.

Referring now to the drawings, a boat 10 has a pair of batteries 12, 14 for powering a trolling motor 16. A trailer 18 towed behind an automobile 20 carries the boat when it is out of the water. Automobile 20 has a standard twelve-volt electrical system powered by a standard 13.8 volt rated automobile battery 22 and an alternator 24 driven by the automobile's engine for recharging the battery 22. Batteries 12, 14 for trolling motor 16 are standard 12.8 volt rated marine batteries, which require periodic recharging after use.

A battery charger 26 for recharging the boat's trolling motor batteries 12, 14 from the automobile's electrical system is carried by boat 10. Battery charger 26 is directly connected to boat's batteries 12, 14 and is connected to automobile's battery 22 with a wiring harness 27.

Figure 4:
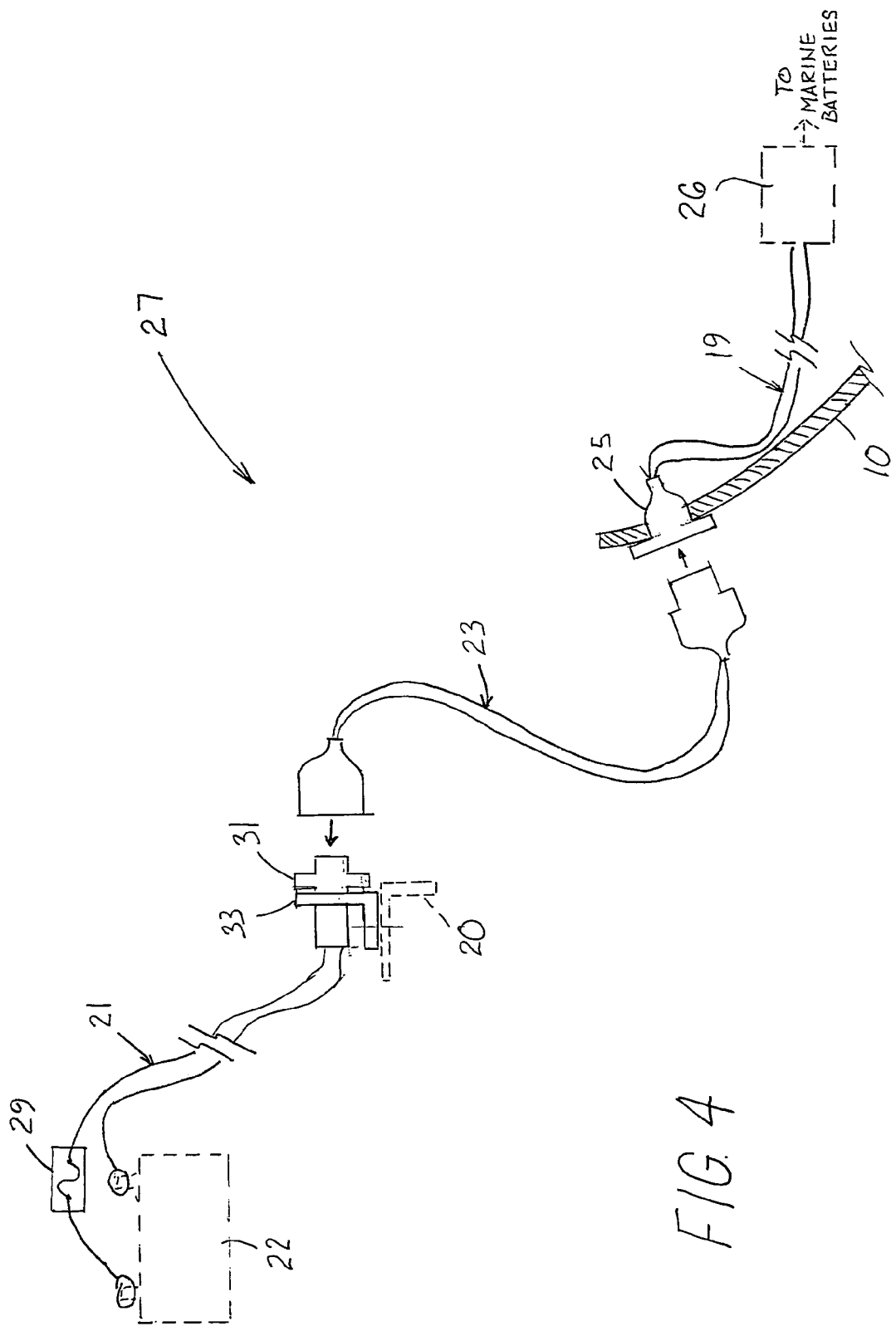
FIG. 4 is a schematic diagram of the wiring harness from the automobile battery to the battery charger.

Wiring harness 27, best shown in FIG. 4, includes a boat harness 19 carried by boat 10, an automobile harness 21 carried by automobile 20, and a jumper harness 23 for connecting the car harness to the boat harness. Boat harness 19 includes a connection to battery charger 26 and a plug connector 25. Plug connector 25 has a panel mount configuration that is mounted to the exterior hull of boat 10 with boat harness 19 extending through a hole in the boat hull. Automobile harness 21 includes connectors for connection to the terminals of automobile battery 22, a fuse 29, and a plug connector 31 carried by a bracket 33 mounted to the bumper of automobile 20. Fuse 29, electrically interposed between battery charger 26 and the automobile's electrical system, prevents short circuits or faults in the charger or boat's electrical system from causing catastrophic damage to the automobile's electrical system. Automobile harness 21 is secured to the body of automobile 20 with ties or brackets between the battery 22 and the bumper. Preferably, boat harness 19 is similarly secured to the boat hull. Jumper harness is connected between boat harness 19 and automobile harness 21 when it is desired to charge marine batteries 12, 14 from automobile battery 22. Plug socket 25 will accept connection to either jumper harness 23 or to a conventional battery charger.

Figure 2:
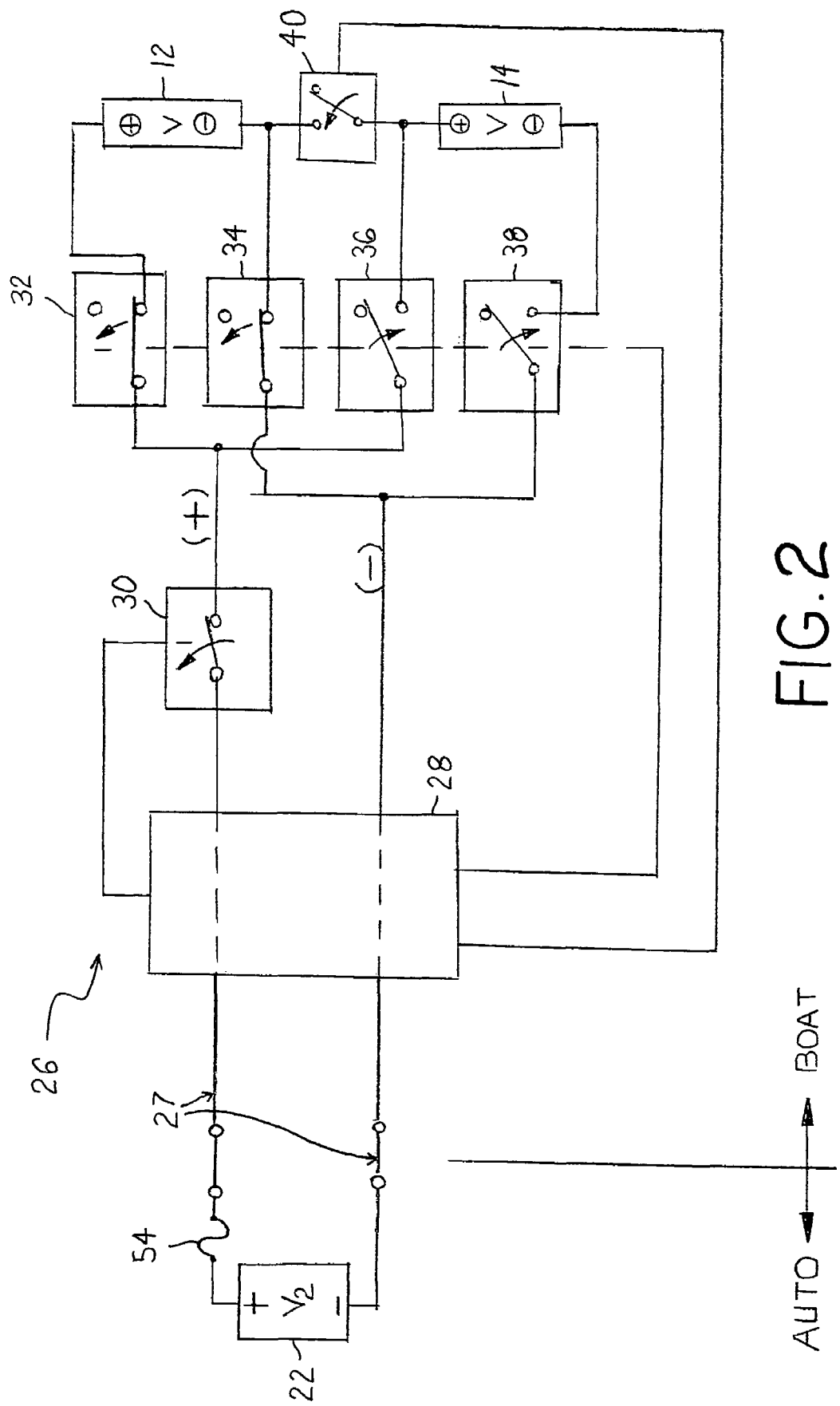
FIG. 2 is a block diagram of the battery charger circuit from the automotive electrical system to the marine electrical system.
Figure 3:
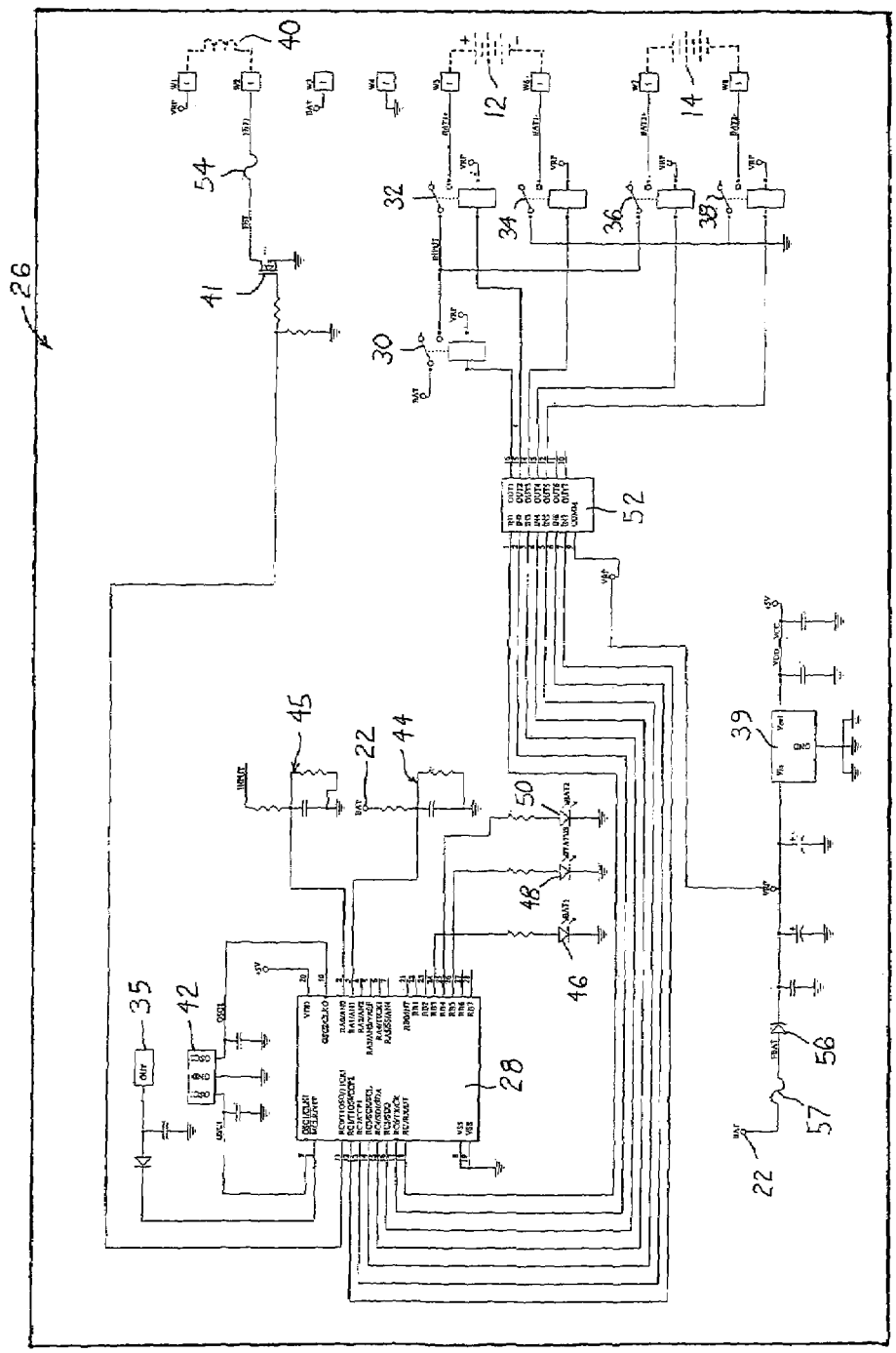
FIG. 3 is a schematic circuit diagram of the battery charger.

Focusing now on FIGS. 2 and 3, battery charger 26 includes a control microprocessor 28, an on/off SPDT relay switch 30, steering SPDT relay switches 32, 34, 36, 38, and a decoupling solenoid 40, all appropriately connected by appropriate electrical conductors as required to accommodate the various functions described herein. Microprocessor 28 is powered from current provided from automobile battery 22 after being stepped down to five volt current through voltage regulator 39. Microprocessor 28 is preferably a PIC16F873-04I/P integrated chip (IC) or equivalent. Voltage regulator 39 is preferably an MIC2950-06BZ integrated circuit or equivalent. Microprocessor 28 is connected to a clock, or resonator circuit, 42 for providing known regular time increments to the microprocessor; a reset monitor 35 for initializing the microprocessor; a pair of voltage monitoring divider circuits 44, 45 for providing scaled voltage readings from batteries 12, 14, and 22 to the microprocessor; and, on/off relay switch 30 and steering relay switches 32, 34, 36, 38 for controlling the current between battery 22 and batteries 12 or 14.

Voltage monitoring divider circuit 45 provides a scaled voltage from boat batteries 12 or 14 to microprocessor 28, where it is precisely compared to a first predefined reference voltage provided by regulator 39. Voltage monitoring divider circuit 44 provides a scaled voltage from automobile battery 22 to microprocessor 28, where it is precisely compared to a second predefined reference voltage provided by regulator 39. With regard to the monitoring of boat batteries 12, 14, microprocessor 28 is programmed to either continue with the charge/monitor cycle hereinafter described if the measured voltage level from one of the batteries is below a specified minimum or stop the charge/monitor cycle if the batteries are at or above the specificed minimum voltage. With regard to the monitoring of automobile battery 22, microprocessor 28 is programmed to stop the recharging phase if the automobile electrical system is below a specified minimum voltage. The implementation of these monitoring steps into the recharging phase is more fully described herein below.

Decoupling solenoid 40 is interposed in a circuit between batteries 12, 14 to provide temporary isolation between the two batteries while they are being charged. Solenoid 40 is activated by a field effect transistor (FET) 41 controlled by microprocessor 28. A resettable fuse 54 is located between FET 41 and solenoid 40 to prevent shorts from the boat electrical system from harming the recharger 26. Solenoid 40 is normally closed when batteries 12, 14 are not being recharged to electrically connect the batteries to each other as necessary to power trolling motor 16. When the recharging process is begun, microprocessor 28 causes FET 41 to cause solenoid 40 to open, thereby electrically separating batteries 12, 14. Electrically separating batteries 12 and 14 during charging is necessary to prevent damaging the batteries, boat electrical system, and the charger. When the recharging process is completed, microprocessor 28 causes FET 41 to cause solenoid 40 to close, thereby reconnecting batteries 12, 14.

Relay switches 32, 34 connect the positive and negative terminals of battery 12 to the positive and negative terminals, respectively, of automobile battery 22. Switch 32 opens and closes the circuit to the positive terminal of battery 12, and switch 34 opens and closes the circuit to the negative terminal of the battery. Similarly, relay switches 36, 38 open and close the electrical connections to the positive and negative terminals of battery 14 from the positive and negative terminals, respectively, of automobile battery 22. Switches 32, 34, 36, 38 are each controlled by microprocessor 28 to alternatingly open and close in pairs 32, 34 and 36, 38 such that no more than one of batteries 12, 14 are in a completed charging circuit with the automobile's electrical system at any given time.

Battery charger 26 also includes indicator lights 46, 48, 50 and relay switch driver 52. Indicator lights 46, 50 are LED's controlled by microprocessor 28 to light when either battery 12 (LED 46) or battery 14 (LED 50) are being charged. Indicator light 48 is an LED controlled by microprocessor 28 to indicate whether on/off relay switch 30 is open or closed. Driver 52 is connected to battery 22 and relay switch control output from microprocessor 28 to step up the low power control signals sent from the microprocessor to a higher power actuation signal for actuating relay switches 30, 32, 34, 36, 38. Driver 52 is preferably a DS2003CM integrated circuit or equivalent. A reverse polarity diode 56 interposed between a resettable fuse 57 and the rest of battery charger 26 prevents a reverse polarity hookup of the battery charger from damaging its components.

The recharging phase for boat batteries 12, 14 is initially begun or initialized when battery charger 26 is connected to automobile battery 22 with wiring harness 27. The initial energy surge causes reset monitor 35 to reset clock 42 for microprocessor 28 to zero, which starts the alternating charge/monitor cycle hereinafter described. Reset monitor 35 is preferably an MN1381S integrated circuit or equivalent. Microprocessor 28 then causes solenoid 40 to be opened to isolate boat batteries 12, 14 from each other, and causes on/off relay switch 30 to be closed to complete the circuit between steering relay switches 32, 34, 36, 38 and battery 22 in the automobile's electrical system. Batteries 12, 14 are then re-charged by continuous cycling of a three-step charge/monitor cycle alternating between the two batteries. When the recharging phase is to be ended, microprocessor 28 causes on/off relay switch 30 to open, thereby breaking the circuit between both boat batteries 12, 14 and battery 22 of the automobile's electrical system, and causes solenoid 40 to re-close. On/off relay switch 30 is then maintained in its open position until microprocessor 28 is reset with another initial surge of electrical power.

During the recharging phase, microprocessor 28 is programmed to cause steering relay switches 32, 34, 36, 38 to open or close in a predefined charge/monitor cycle. Each battery 12, 14 is alternatingly cycled through a three-step charge/monitor cycle. In step one, all steering relay switches 32, 34, 36, 38 are open, and the voltage of boat battery 12 is compared to a first predefined reference voltage from regulator 39. If boat battery 12 is already at a predefined minimum voltage level (i.e. the maximum voltage to which charger 26 will charge batteries 12, 14), the battery will not be charged further and microprocessor 28 will cause the charging cycle to switched to the other boat battery 14. If boat battery 12 is below the predefined minimum voltage, the second step includes closing steering relays 32, 34 to complete the circuit between automobile battery 22 and boat battery 12 for a predefined period of time as measured by clock 42. In step three, steering relays 32, 34 are opened for another predefined period of time as measured by clock 42 to allow the charge in battery 12 to approach equilibrium before again monitoring the battery's charge. After the charge/monitor cycle has been completed for battery 12, it is repeated for battery 14 with the corresponding steering relay switches 36, 38 opened and closed. Alternating three-step charge/monitor cycles may alternatively be overlapped such that while one battery is equalizing, the other battery is recharging.

Preferably, the three-step charge/monitor cycle has an approximately two minute period with enough time allotted to step three, the equalizing period, to allow the batteries 12, 14 to reach a relatively stable charge equilibrium before their voltage is monitored again at the beginning of the next cycle. For a pair of 12 volt marine batteries, microprocessor 28 is preferably programmed to end the recharging phase after five hours of continuous charging regardless of the charge in batteries 12, 14 in order to prevent catastrophic overcharging of the batteries in the event of a voltage monitoring or control error.

As an additional precautionary measure, before the charge/monitor cycle is alternated back to the first battery 12, the voltage of automobile battery 22 is compared to a second predefined reference voltage provided by regulator 39. If the automobile electrical system is below the second reference voltage, such as usually occurs when the vehicle is not running or alternator 24 is not working correctly, microprocessor 28 causes charger 26 to be switched off until the microprocessor is again reset by reset monitor 35. In this manner, the three-step charge/monitor cycle continues alternating between batteries 12, 14 until either both batteries are fully charged, or until a total predefined recharging time period has elapsed since microprocessor 28 was initially reset, or until the automobile battery 22 falls below its predefined minimum voltage.

Battery charger 26 may also be connected to a stationary battery charging unit to recharge boat batteries 12, 14 when not being towed by automobile 20.

The detailed description related herein is only meant to exemplify the preferred embodiment of the invention to enable those skilled in the art to make and use it. It is specifically anticipated that the various settings in the system could be simply modified to provide a charger for charging other types and ratings of batteries from an automobile electrical system or another type of charging system. One example of which would be modifying the described embodiment to charge batteries in small components, such as electric toys or tools for example, from the electrical system of a recreational vehicle. In any event, the subject invention is not to be limited to the details given above for the preferred embodiment, but may be modified within the scope of the impending claims

We claim:

1. A battery charger for charging a first battery with a first voltage rating from a charging system for recharging a second battery having a second voltage rating, said charger interposed in a circuit connecting said first battery to said second battery, said battery charger comprising:
   a relay switch interposed in said circuit between said first and second batteries, said switch having an open position in which no electrical current flows between said first and second batteries and a closed position in which electrical current flows between the batteries;
   a timer mechanism connected to said relay switch, said timer mechanism for causing said relay switch to alternate between said open and closed positions at predefined time periods;
   a voltage monitor connected to said first battery, said voltage monitor for detecting the voltage stored in said first battery;
   wherein said voltage monitor causes said circuit to remain open when said first battery reaches a predefined minimum voltage.

2. The battery charger of claim 1 and further comprising:
   a second relay switch interposed in said circuit between said first and second batteries, said second relay switch connected to said timer and said voltage monitor and having an open position and a closed position;
   wherein said second relay switch closes when said first battery is initially connected to said second battery across said circuit and,
   wherein said second relay is caused to remain open after the first to occur of either the lapse of a second predefined period of time as indicated by said timer or said first battery reaching a predefined minimum voltage as indicated by said voltage monitor.

3. A battery charger for charging a plurality of first batteries each having a first voltage rating from a charging system for recharging a second battery having a second voltage rating, said charger interposed in a circuit connecting each said first batteries in parallel to said second battery, said charger comprising:
   a decoupling solenoid interconnected between electrically adjacent said first batteries, said solenoid caused to be open when the first batteries are charging;
   a first relay switch interposed in said circuit between each said first batteries and said second battery, each said switch having an open position in which no electrical current flows between its said first battery and said second battery and a closed position in which electrical current flows between the last said batteries;
   a second relay switch interposed in said circuit between said second battery and all said first batteries, said second relay switch having an open position and a closed position;
   a control processor including a clock and a voltage monitor, said control processor connected to said first relay switches, to said second relay switch, to each said first batteries, to said second battery, and to said decoupling solenoid;
   wherein said clock in said control processor causes said relay switches to alternatingly open and close for a predefined period of time in sequence such that no more than one said first batteries is in a closed circuit with said second battery at any time; and,
   wherein said control processor causes said second relay switch switches to switch to said closed position when said first batteries are initially connected to said second battery and to switch to said open position when said first batteries reach either a specified minimum voltage as controlled by said voltage monitor or after a second predetermined period of time as controlled by said timer, whichever occurs first.

4. A method of recharging a plurality of first batteries having a first voltage rating from a charging system for recharging a second battery having a second voltage rating, said method comprising the steps:
   a. electrically isolating said first batteries from each other;
   b. comparing the voltage in one of said first batteries to a predefined voltage;
   c. skipping steps d and e if said voltage in said one of said first batteries is greater than said predefined minimum voltage
   d. connecting said one of said first batteries to said second battery for a predefined period of time if said voltage in said one of said first batteries is less than a predefined minimum voltage;
   e. disconnecting said one of said first batteries from said second battery for a second predefined period of time;
   f. repeating steps b, c, d, e, and f on each of the other of said first batteries in alternating sequence until the voltage in each of said first batteries reaches a predefined minimum voltage.

* * * * *